US007084928B2

(12) United States Patent
Tanigawa

(10) Patent No.: US 7,084,928 B2

(45) Date of Patent: Aug. 1, 2006

(54) VIDEO SIGNAL PROCESSING DEVICE AND METHOD

(75) Inventor: Satoru Tanigawa, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 548 days.

(21) Appl. No.: 10/669,010

(22) Filed: Sep. 24, 2003

(65) Prior Publication Data

US 2004/0109090 A1 Jun. 10, 2004

(30) Foreign Application Priority Data

Dec. 6, 2002 (JP) ............................ 2002-355811

(51) Int. Cl.
*H04N 9/77* (2006.01)
*H04N 9/78* (2006.01)

(52) U.S. Cl. ...................... 348/663; 348/665; 348/664; 348/624

(58) Field of Classification Search ................ 348/663, 348/664, 665, 624, 638, 609, 666, 667, 668, 348/669, 670
See application file for complete search history.

(56) References Cited

U.S. PATENT DOCUMENTS

| | | | | |
|---|---|---|---|---|
| 5,225,899 | A * | 7/1993 | Park | 348/665 |
| 5,249,040 | A * | 9/1993 | Sugiyama | 348/663 |
| 5,392,075 | A * | 2/1995 | Gai | 348/663 |
| 5,416,531 | A * | 5/1995 | Gai | 348/663 |
| 5,517,255 | A * | 5/1996 | Gai et al. | 348/663 |
| 5,530,486 | A * | 6/1996 | Hong | 348/663 |
| 5,583,579 | A * | 12/1996 | Shim | 348/668 |
| 5,585,861 | A * | 12/1996 | Taniguchi et al. | 348/669 |
| 5,594,508 | A | 1/1997 | Penney | |
| 5,686,972 | A * | 11/1997 | Kim | 348/663 |
| 5,786,872 | A * | 7/1998 | Miyazaki et al. | 348/669 |
| 5,909,255 | A * | 6/1999 | Hatano | 348/663 |
| 5,959,695 | A * | 9/1999 | Sugimoto et al. | 348/663 |
| 5,969,771 | A * | 10/1999 | Sugimoto et al. | 348/663 |
| 6,108,048 | A | 8/2000 | Rinaldi | |
| 6,288,754 | B1 * | 9/2001 | Ito | 348/663 |
| 6,738,097 | B1 * | 5/2004 | Satoh | 348/663 |
| 6,809,778 | B1 * | 10/2004 | Shibutani et al. | 348/667 |
| 6,956,620 | B1 * | 10/2005 | Na | 348/663 |
| 6,995,804 | B1 * | 2/2006 | Kwon et al. | 348/663 |
| 6,999,130 | B1 * | 2/2006 | Tanigawa | 348/663 |
| 2004/0119892 | A1 * | 6/2004 | Ishihara | 348/663 |

FOREIGN PATENT DOCUMENTS

| | | |
|---|---|---|
| JP | 03-053788 | 3/1991 |
| JP | 05-037955 | 2/1993 |
| JP | 5-111051 A | 4/1993 |

* cited by examiner

*Primary Examiner*—David Ometz
*Assistant Examiner*—Jean W. Désir
(74) *Attorney, Agent, or Firm*—McDermott Will & Emery LLP

(57) ABSTRACT

An oblique correlation detection section detects correlation in an oblique direction (oblique correlation) of a composite video signal. A line correlation chrominance separation section extracts a first chrominance signal from the composite video signal based on vertical correlation of the composite video signal. A first chrominance signal acquisition section acquires a second chrominance signal based on horizontal self-correlation of the first chrominance signal. The first chrominance signal acquisition section detects the self-correlation within a range corresponding to the degree of the oblique correlation detected by the oblique detection section.

14 Claims, 8 Drawing Sheets

VIDEO SIGNAL PROCESSING DEVICE AND METHOD

BACKGROUND OF THE INVENTION

The present invention relates to a device and method for separating a luminance signal (Y) and/or a chrominance signal (C) from a composite video signal.

In recent years, as TV receivers have been increasingly upsized and enhanced in image quality, higher importance has been placed on enhancement in the performance of a Y/C separation device for separating a luminance signal (Y) and a chrominance signal (C) from a composite video signal.

A conventional Y/C separation device will be described with reference to FIG. 11. FIG. 11 is a block diagram of a Y/C separation device disclosed in Japanese Laid-Open Patent Publication No. 5-111051. Referring to FIG. 11, an input terminal 31 receives a band-limited chrominance signal output from a multi-line comb filter. Delay circuits 32 to 35, connected to the input terminal 31 in series, respectively delay the input signal by a half period of the chrominance signal and output the delayed signal. Inverter circuits 36 and 37 are connected to the delay circuits 32 and 34, respectively. Minimum circuits 38 to 45 are placed to receive the delayed signals. The minimum circuits 38 to 42, respectively having three input terminals, select the minimum signal among signals input at the three input terminals and output the selected signal. The minimum circuits 43 to 45, respectively having two input terminals, select the minimum signal among signals input at the two input terminals and output the selected signal. Specifically, the three input terminals of the minimum circuit 38 receive the signals from the inverter circuit 37, the delay circuit 35 and the input terminal 31. The three input terminals of the minimum circuit 39 receive the signals from the delay circuit 35, the input terminal 31 and the inverter circuit 36. The three input terminals of the minimum circuit 40 receive the signals from the input terminal 31, the inverter circuit 36 and the delay circuit 33. The three input terminals of the minimum circuit 41 receive the signals from the inverter circuits 36 and 37 and the delay circuit 33. The three input terminals of the minimum circuit 42 receive the signals from the delay circuits 33 and 35 and the inverter circuit 37. The two input terminals of the minimum circuit 43 receive the signals from the inverter circuit 37 and the delay circuit 33. The two input terminals of the minimum circuit 44 receive the signals from the inverter circuit 36 and the delay circuit 33. The two input terminals of the minimum circuit 45 receive the signals from the inverter circuits 36 and 37. The output signals of the minimum circuits 38 to 42 are supplied to a maximum circuit 46, which selects the signal having the maximum amplitude among the five input signals and outputs the selected signal as a chrominance signal via an output terminal 47. The output signals of the minimum circuits 43 to 45 are supplied to a maximum circuit 49, which selects the signal having the maximum amplitude among the three input signals and outputs the selected signal to a subtractor 50. The subtractor 50 subtracts the output signal of the maximum circuit 49 from a composite video signal input at an input terminal 51 and outputs the result as a luminance signal via an output terminal 52.

The operation of the Y/C separation device configured as described above will be described.

FIG. 8 shows output waveforms on the side of the maximum circuit 49 obtained when a 1-period chrominance signal is input at the input terminal 31. FIG. 10 shows output waveforms on the side of the maximum circuit 46 obtained when a 1.5-period chrominance signal is input at the input terminal 31. Description on the progress of the operation of this device is omitted here. See Japanese Laid-Open Patent Publication No. 5-111051 for details. The same reference codes as those used in this publication are used herein for easy reference. On the side of the maximum circuit 49 in FIG. 11, any input signal of one period or more is recognized as a chrominance signal. Therefore, an input 1-period signal is output as it is from the maximum circuit 49. On the side of the maximum circuit 46 in FIG. 11, any input signal of 1.5 periods or more is recognized as a chrominance signal. Therefore, an input 1.5-period signal is output as it is from the maximum circuit 46.

The conventional Y/C separation device described above recognizes input of a signal of 1.5 periods or more as input of a chrominance signal. Therefore, while the device can remove a signal representing input of a fine oblique line of one period or less, for example, it fails to remove a signal representing continuous input of an oblique line, for example, and thus is poor in cross-color suppression effect.

SUMMARY OF THE INVENTION

An object of the present invention is providing a video signal processing device and method capable of reducing occurrence of cross-color due to leakage of a luminance signal component into a chrominance signal, in an event of input of a luminance signal having continuous correlation in an oblique direction, not only in an event of input of a luminance signal representing a fine oblique line.

The video signal processing device of the present invention includes: an oblique correlation detection section, a line correlation chrominance separation section and a first chrominance signal acquisition section. The oblique correlation detection section detects correlation in an oblique direction (oblique correlation) of a composite video signal. The line correlation chrominance separation section extracts a first chrominance signal from the composite video signal based on vertical correlation of the composite video signal. The first chrominance signal acquisition section acquires a second chrominance signal based on horizontal self-correlation of the first chrominance signal. The first chrominance signal acquisition section detects the self-correlation within a range corresponding to the degree of the oblique correlation detected by the oblique detection section.

The video signal processing method of the present invention includes steps (a) to (c). In the step (a), correlation in an oblique direction (oblique correlation) of a composite video signal is detected. In the step (b), a first chrominance signal is extracted from the composite video signal based on vertical correlation of the composite video signal. In the step (c), a second chrominance signal is acquired based on horizontal self-correlation of the first chrominance signal. In the step (c), the self-correlation is detected within a range corresponding to the degree of the oblique correlation detected in the step (a).

According to the present invention, the correlation of luminance signal components in an oblique direction is detected from 3-line video signals of an input composite video signal. According to the result of this detection, the horizontal correlation detection range is switched. Therefore, in an event that an oblique-direction luminance signal component representing an oblique line, for example, enters the line correlation chrominance separation circuit and fails to be correctly separated by the line correlation chrominance separation circuit, resulting in leakage into the output line correlation chrominance signal, the horizontal correlation range can be widened. By this widening, occurrence of cross-color can be reduced in the output chrominance signal, and in addition, the resolution in the oblique direction can be improved in the output luminance signal. When no oblique line is input, the horizontal correlation range may be narrowed, so that the normal chrominance signal can be correctly output, and thus decolorization and reduction in color saturation, which may occur when the horizontal correlation range is excessively wide, can be suppressed.

The video signal processing device of the present invention is suitably used for equipment outputting a video signal, such as a TV receiver including a liquid crystal TV, a plasma display TV and an organic EL TV, a video capture board, a personal computer, a videocassette recorder and the like, to reduce cross-color that may occur when a video signal containing an oblique line is input, or suppress decolorization and reduction in color saturation that may occur when a video signal containing no oblique line is input.

DESCRIPTION OF THE PREFERRED EMBODIMENTS

<Entire Construction of TV Receiver>

Figure 1:
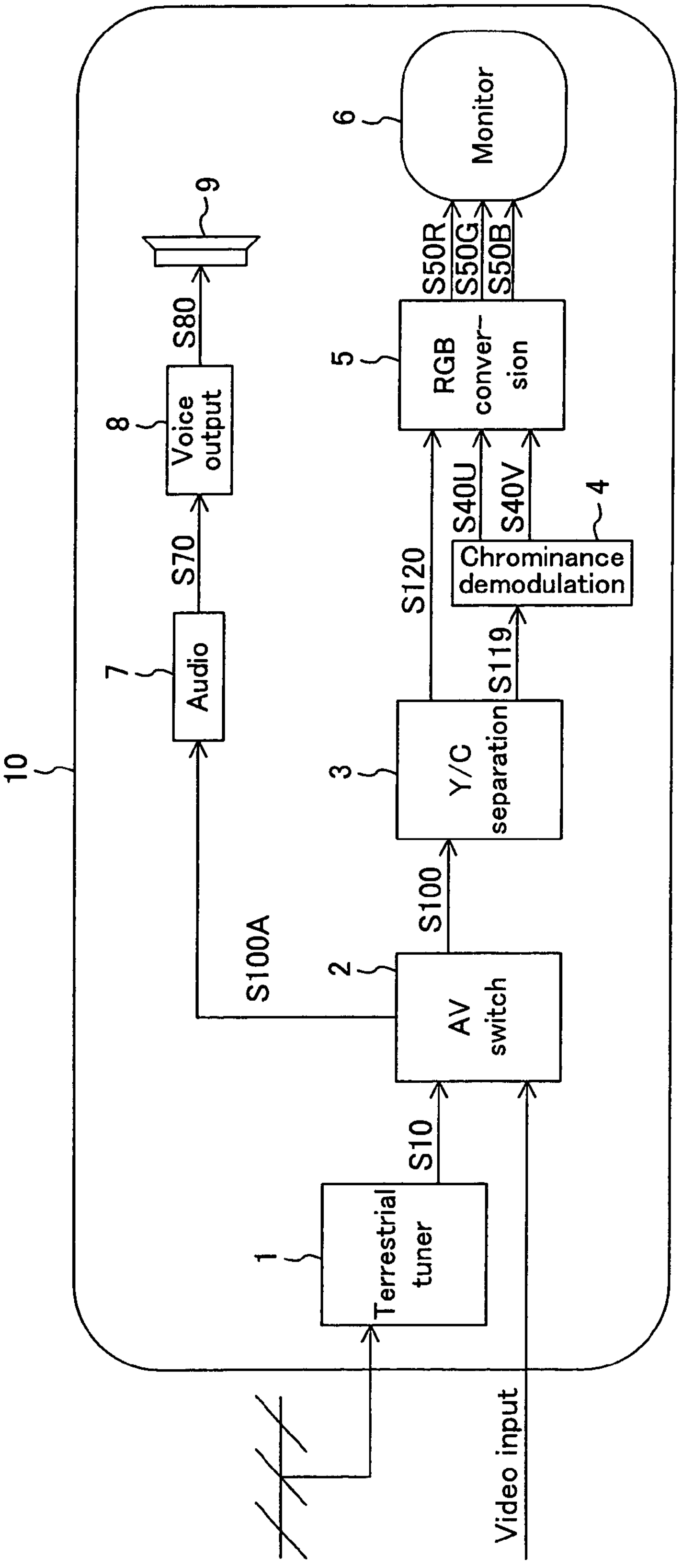
FIG. 1 is a block diagram showing the entire construction of a TV receiver in an embodiment of the present invention.

FIG. 1 is a block diagram showing the entire construction of a TV receiver 10 in an embodiment according to the present invention. The TV receiver 10 includes a terrestrial tuner 1, an AV switch 2, a Y/C separation device 3, a chrominance demodulation circuit 4, a RGB conversion circuit 5, a monitor 6, an audio processing circuit 7, a voice output circuit 8 and a speaker 9.

The terrestrial tuner 1 receives broadcasts allocated for respective channels. The AV switch 2 switches between a terrestrial broadcast signal S10 received via the tuner 1 and video signal/audio signal input from external equipment such as a videocassette recorder. The Y/C separation device 3 separates a composite video signal S100 output from the AV switch 2 into a luminance signal S120 and a chrominance signal S119. The chrominance demodulation circuit 4 demodulates the chrominance signal S119 output from the Y/C separation device 3 to a U signal S40U and a V signal S40V as color-difference signals. The RGB conversion circuit 5 converts the luminance signal S120 output from the Y/C separation device 3 and the U signal S40U and the V signal S40V output from the chrominance demodulation circuit 4 into a R signal S50S, a G signal S50G and a B signal S50B. The monitor 6 displays an image from the R signal S50R, the G signal S50G and the B signal S50B output from the RGB conversion circuit 5. The audio processing circuit 7 processes an audio signal S100A output from the AV switch 2. The voice output circuit 8 amplifies an audio signal S70 output from the audio processing circuit 7 and outputs an amplified audio signal S80 to the speaker 9. The speaker 9 outputs the audio signal S80 externally.

<Internal Configuration of Y/C Separation Device 3>

Figure 2:
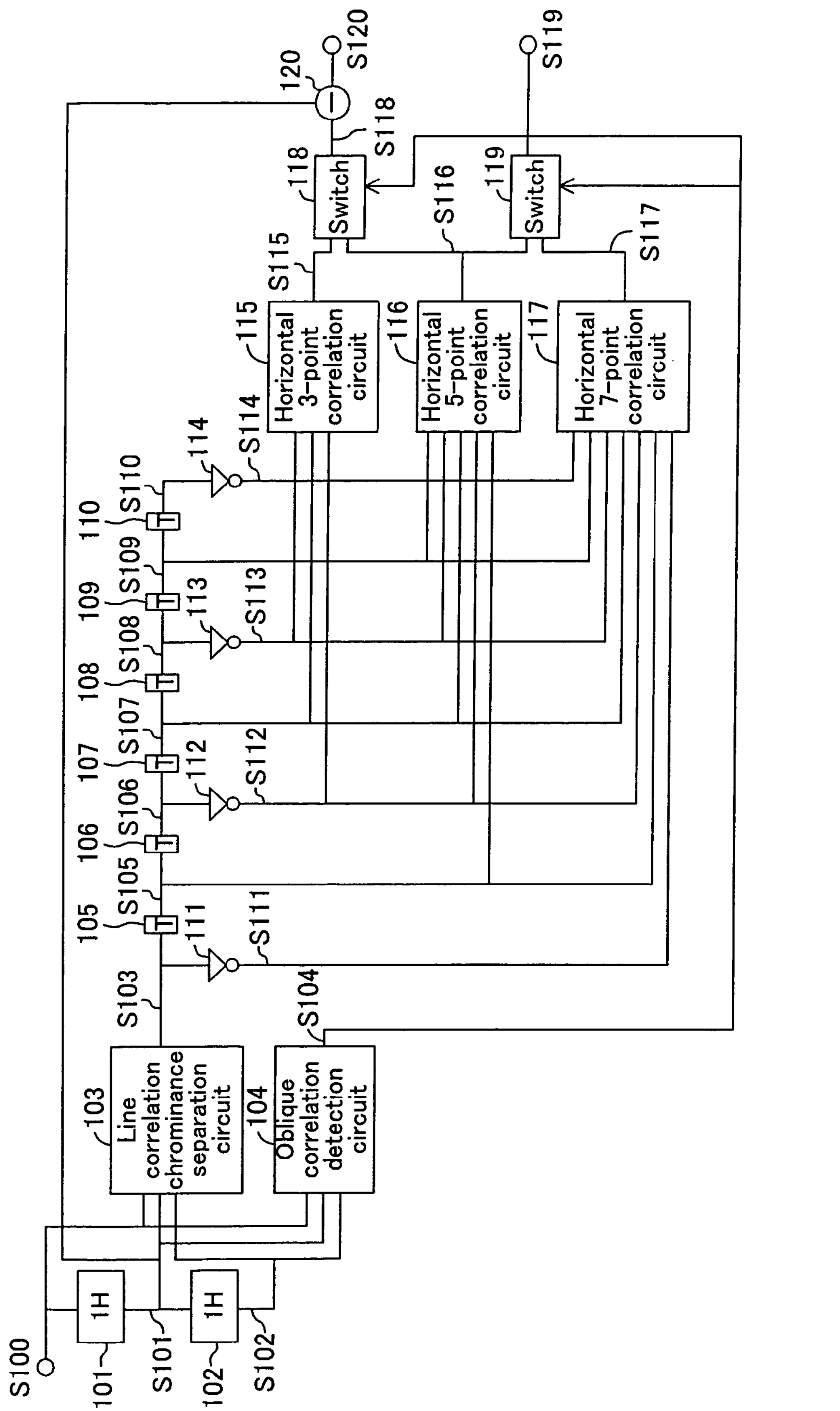
FIG. 2 is a block diagram of a Y/C separation device shown in FIG. 1.

FIG. 2 is a block diagram of the Y/C separation device 3 shown in FIG. 1. The Y/C separation device 3 includes line memories 101 and 102, a line correlation chrominance separation circuit 103, an oblique correlation detection circuit 104, delay circuits 105 to 110, inverter circuits 111 to 114, a horizontal 3-point correlation circuit 115, a horizontal 5-point correlation circuit 116, a horizontal 7-point correlation circuit 117, switch circuits 118 and 119 and a subtractor 120.

The line memory 101 delays the composite video signal S100 output from the AV switch 2 (see FIG. 1) by one horizontal scanning period (1 line). The line memory 102 delays a video signal S101 output from the line memory 101 by one horizontal scanning period (1 line).

The line correlation chrominance separation circuit 103 extracts a chrominance signal S103 from the composite video signal based on the correlation among the composite video signal S100, the video signal S101 from the line memory 101 and a video signal S102 from the line memory 102 (3-line correlation).

The oblique correlation detection circuit 104 detects the correlation of luminance signal components of the composite video signal in an oblique direction (oblique correlation).

The delay circuits 105 to 110 respectively delay the input chrominance signal by a half period of the chrominance signal. The delay circuit 105 delays the chrominance signal S103 output from the line correlation chrominance separation circuit 103. The delay circuits 106 to 110 respectively delay signals S105 to S109 output from the preceding delay circuits 105 to 109.

The inverter circuit 111 inverts the chrominance signal S103 output from the line correlation chrominance separation circuit 103. The inverter circuits 112, 113 and 114 respectively invert the signals S106, S108 and S110 output from the delay circuits 106, 108 and 110.

The horizontal 3-point correlation circuit 115 detects the correlation of the chrominance signal S103 based on the three signals S112, S107 and S113 each delayed by a half period of the chrominance signal, and outputs a signal S115 indicating the median level of the signals S112, S107 and S113.

The horizontal 5-point correlation circuit 116 detects the correlation of the chrominance signal S103 based on the five signals S105, S112, S107, S113 and S109 each delayed by a half period of the chrominance signal, and outputs a signal S116 indicating the median level of the signals S105, S112, S107, S113 and S109.

The horizontal 7-point correlation circuit 117 detects the correlation of the chrominance signal S103 based on the seven signals S111, S105, S112, S107, S113, S109 and S114 each delayed by a half period of the chrominance signal, and outputs a signal S117 indicating the median level of the signals S111, S105, S112, S107, S113, S109 and S114.

The switch circuit 118 switches between the horizontal 3-point correlation output signal S115 and the horizontal 5-point correlation output signal S116 according to a detection result S104 of the oblique correlation detection circuit 104.

The switch circuit 119 switches between the horizontal 5-point correlation output signal S116 and the horizontal 7-point correlation output signal S117 according to the detection result S104 of the oblique correlation detection circuit 104.

The subtractor 120 subtracts an output signal S118 of the switch circuit 118 from the 1-line delayed composite video signal S101.

<Internal Configuration of Horizontal 3-Point Correlation Circuit 115>

Figure 3:
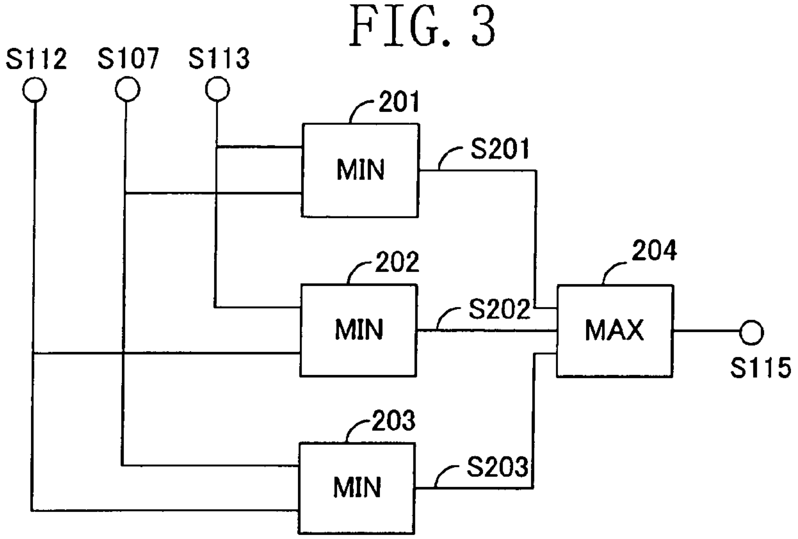
FIG. 3 is a block diagram of a horizontal 3-point correlation circuit shown in FIG. 2.

FIG. 3 is a block diagram of the horizontal 3-point correlation circuit 115 shown in FIG. 2. The horizontal 3-point correlation circuit 115 includes minimum circuits 201 to 203 and a maximum circuit 204. The minimum circuits 201 to 203 respectively receive two signals (S107 and S113), (S113 and S112) and (S112 and S107) among the adjacent three signals (S112, S107 and S113) of the chrominance signal delayed by a half period each, and select the minimum from the input signals. The maximum circuit 204 selects the maximum from output signals S201 to S203 of the minimum circuits 201 to 203 and outputs the result.

<Internal Configuration of Horizontal 5-Point Correlation Circuit 116>

Figure 4:
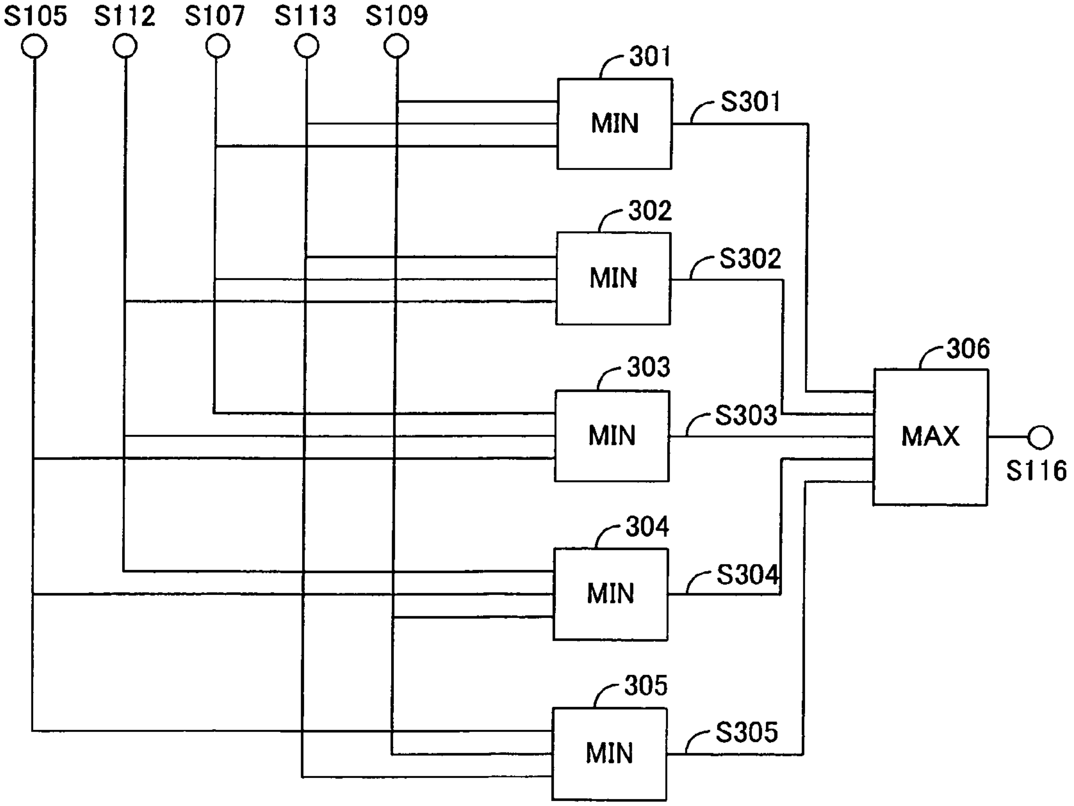
FIG. 4 is a block diagram of a horizontal 5-point correlation circuit shown in FIG. 2.

FIG. 4 is a block diagram of the horizontal 5-point correlation circuit 116 shown in FIG. 2. The horizontal 5-point correlation circuit 116 includes minimum circuits 301 to 305 and a maximum circuit 306. The minimum circuits 301 to 305 respectively receive three signals (S107, S113 and S109), (S112, S107 and S113), (S105, S112 and S107), (S109, S105 and S112) and (S113, S109 and S105) among the adjacent five signals (S105, S112, S107, S113 and S109) of the chrominance signal delayed by a half period each, and select the minimum from the input signals. The maximum circuit 306 selects the maximum from output signals S301 to S305 of the minimum circuits 301 to 305 and outputs the result.

<Internal Configuration of Horizontal 7-Point Correlation Circuit 117>

Figure 5:
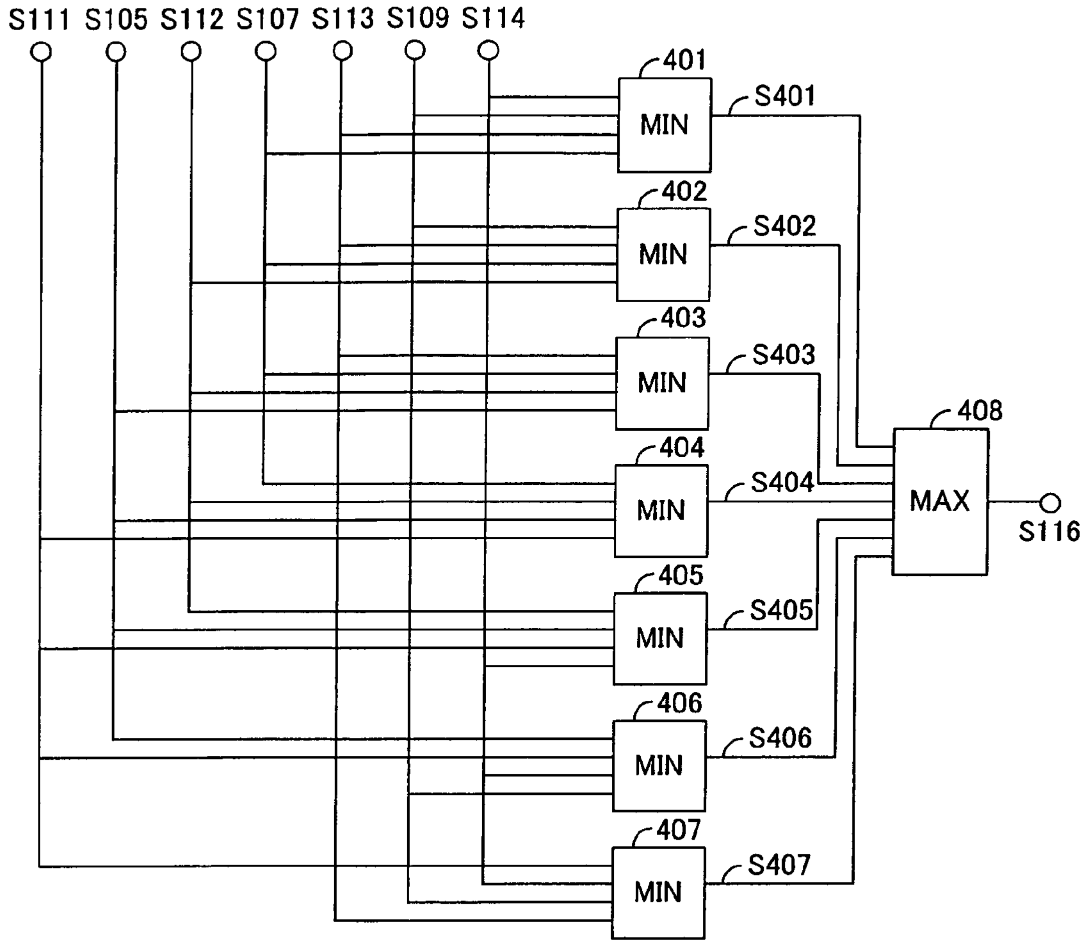
FIG. 5 is a block diagram of a horizontal 7-point correlation circuit shown in FIG. 2.

FIG. 5 is a block diagram of the horizontal 7-point correlation circuit 117 shown in FIG. 2. The horizontal 7-point correlation circuit 117 includes minimum circuits 401 to 407 and a maximum circuit 408. The minimum circuits 401 to 407 respectively receive four signals (S107, S113, S109 and S114), (S112, S107, S113 and S109), (S105, S112, S107 and S113), (S111, S105, S112 and S107), (S114, S111, S105 and S112), (S109, S114, S111 and S105), (S113, S109, S114 and S111) among the adjacent seven signals (S111, S105, S112, S107, S113, S109 and S114) of the chrominance signal delayed by a half period each, and select the minimum from the input signals. The maximum circuit 408 selects the maximum from output signals S401 to S407 of the minimum circuits 401 to 407 and outputs the result.

<Internal Configuration of Oblique Correlation Detection Circuit 104>

Figure 6:
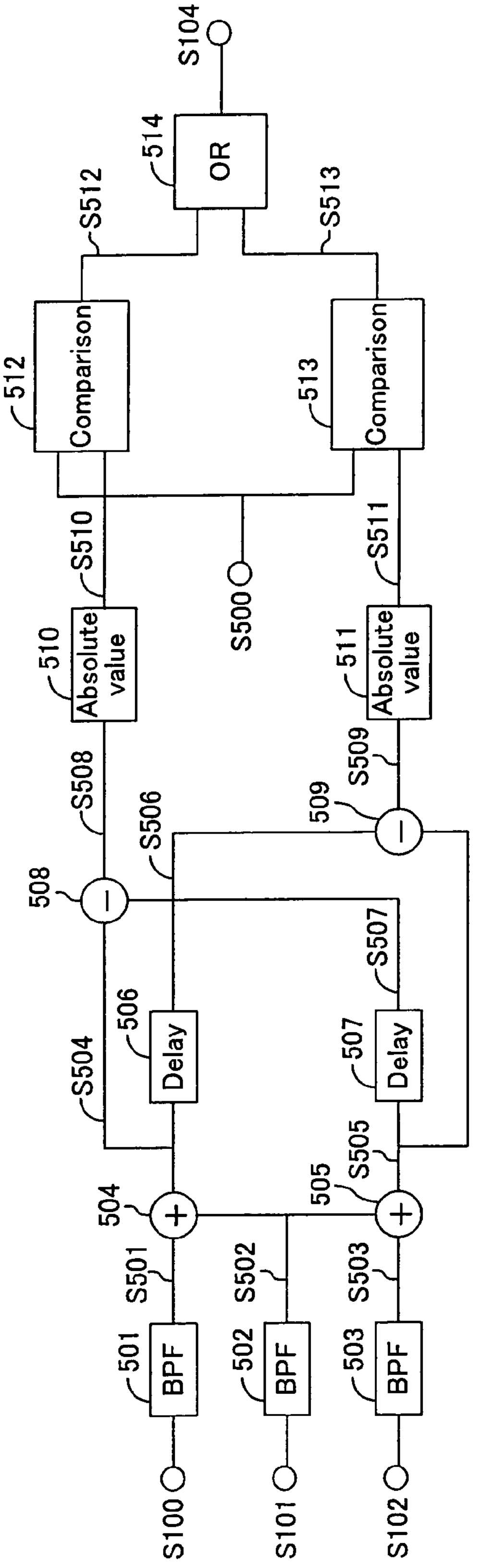
FIG. 6 is a block diagram of an oblique correlation detection circuit shown in FIG. 2.

FIG. 6 is a block diagram of the oblique correlation detection circuit 104 shown in FIG. 2. The oblique correction detection circuit 104 includes band-pass filters 501, 502 and 503, adders 504 and 505, delay circuits 506 and 507, subtractors 508 and 509, absolute value circuits 510 and 511, comparison circuits 512 and 513 and an OR circuit 514. The band-pass filters 501, 502 and 503 respectively extract band-limited signals S501, S502 and S503 from the composite video signals S100, S101 and S102 with a chrominance subcarrier frequency of 3.58 MHz as the center frequency. The adder 504 adds the band-limited signals S501 and S502 output from the band-pass filters 501 and 502. The adder 505 adds the band-limited signals S502 and S503 output from the band-pass filters 502 and 503. The delay circuits 506 and 507 respectively delay signals S504 and S505 output from the adders 504 and 505 at a clock frequency four times as large as the chrominance subcarrier frequency. The subtractors 508 and 509 respectively subtract signals S507 and S506 output from the delay circuits 507 and 506 from the signals S504 and S505 output from the adders 504 and 505. The absolute value circuits 510 and 511 respectively compute the absolute values of the outputs of the subtractors 508 and 509. The comparison circuits 512 and 513 respectively compare the values output from the absolute value circuits 510 and 511 with a reference value. The OR circuit 514 outputs a determination of being "correlated" if at least one of the comparison circuits 512 and 513 outputs this determination.

<Operation of Y/C Separation Device 3>

The operation of the Y/C separation device 3 having the configuration described above will be described.

First, the line memories 101 and 102 receive the composite video signal S100 from the AV switch 2, and provide the composite video signal S102 delayed by one line and the composite video signal S102 delayed by another line based on the received composite video signal S100.

The oblique correlation detection circuit 104 receives the 3-line composite video signals S100, S101 and S102 provided by the line memories 101 and 102.

In the oblique correction detection circuit 104, the band-pass filters 501, 502 and 503 respectively band-limit the input composite video signals S100, S101 and S102 with a pass frequency band having a center frequency of 3.58 MHz, to obtain the 3.58 MHz band-limited signals S501, S502 and S503.

The adder 504 adds the band-limited signal S502 for the center line and the band-limited signal S501 apart by one line from the signal S502. The color phase inverts by 180 degrees between the adjacent lines. Therefore, by adding the band-limited signals S502 and S501 apart by one line from each other with the adder 504, the chrominance signal components cancel each other out, and as a result, the band-limited luminance component signal S504 is obtained. Likewise, the adder 505 adds the band-limited signal S502 for the center line and the band-limited signal S503 apart by one line from the signal S502. By this addition, the chrominance signal components cancel each other out, and as a result, the band-limited luminance component signal S505 is obtained.

The delay circuits 506 and 507 respectively delay the luminance component signals S504 and S505 output from the adders 504 and 505 every clock, to obtain the delayed luminance component signals S506 and S507.

The subtractor 508 computes the difference between the band-limited luminance component signal S504 and the luminance component signal S507 delayed by the delay circuit 507, to thereby obtain an oblique-direction correlation value S508 of the luminance signal component from the difference between sample points deviated from each other in an oblique direction.

The absolute value circuit 510 computes the absolute value of the correlation value S508 output from the subtractor 508 to thereby obtain an oblique-direction difference value S510.

The comparison circuit 512 compares the oblique-direction difference value S510 output from the absolute value circuit 510 with an oblique component reference level S500. If the oblique-direction difference is small enough to be less than the oblique component reference level S500, the comparison circuit 512 determines that there is oblique-direction correlation and outputs a signal S512 indicating "correlated" to the OR circuit 514. If the oblique-direction difference is large enough to be more than the oblique component reference level S500, the comparison circuit 512 determines that there is no oblique-direction correlation and outputs the signal S512 indicating "not correlated" to the OR circuit 514.

Similarly, to detect an oblique component opposite to the direction of the oblique component described above, the subtractor 509, like the subtractor 508, computes the difference between the band-limited luminance component signal S505 and the luminance component signal S506 delayed by the delay circuit 506, to thereby obtain an oblique-direction correlation value S509 of the luminance signal component from the difference between sample points deviated from each other in an oblique direction.

Like the absolute value circuit 510, the absolute value circuit 511 computes the absolute value of the correlation value S509 output from the subtractor 509 to thereby obtain an oblique-direction difference value S511.

The comparison circuit 513 compares the oblique-direction difference value S511 output from the absolute value circuit 511 with the oblique component reference level S500. If the oblique-direction difference is small enough to be less than the oblique component reference level S500, the comparison circuit 513 determines that there is oblique-direction correlation and outputs a signal S513 indicating "correlated" to the OR circuit 514. If the oblique-direction difference is large enough to be more than the oblique component reference level S500, the comparison circuit 513 determines that there is no oblique-direction correlation and outputs a signal S513 indicating "not correlated" to the OR circuit 514.

The OR circuit 514 outputs the signal S104 indicating "correlated" to the switch circuits 118 and 119 if at least one of the signal S512 output from the comparison circuit 512 and the signal S513 output from the comparison circuit 513 indicates "correlated", or outputs the signal S104 indicating "not correlated" to the switch circuits 118 and 119 if both the signal S512 and the signal S513 indicate "not correlated".

The line correlation chrominance separation circuit 103 puts limitations on the input 3-line composite video signals S100, S101 and S102 with band-pass filters having a pass frequency band with a center frequency of 3.58 MHz, and adopts a majority decision or use a median value to determine the 3-line correlation of the chrominance signal, to thereby obtain the 3-line correlation chrominance signal S103.

The delay circuits 105 to 110, connected in series downstream the line correlation chrominance separation circuit 103, respectively delay the input chrominance signal by a half period each.

The inverter circuits 111, 112, 113 and 114 respectively invert the line correlation chrominance signal S103 and the delayed signals S106, S108 and S110, to obtain the inverted delayed signals S111, S112, S113 and S114.

The horizontal 3-point correlation circuit 115 receives the delayed signal S107 delayed by the delay circuit 107 and the inverted delayed signals S112 and S113 respectively inverted by the inverter circuits 112 and 113, and outputs the median value S115 determined from the magnitudes of the input three signals.

The horizontal 5-point correlation circuit 116 receives the delayed signals S105, S107 and S109 respectively delayed by the delay circuits 105, 107 and 109 and the inverted delayed signals S112 and S113 respectively inverted by the inverter circuits 112 and 113, and outputs the median value S116 determined from the magnitudes of the input five signals.

The horizontal 7-point correlation circuit 117 receives the delayed signals S105, S107 and S109 respectively delayed by the delay circuits 105, 107 and 109 and the inverted delayed signals S111, S112, S113 and S114 respectively inverted by the inverter circuits 111, 112, 113 and 114, and outputs the median value S117 determined from the magnitudes of the input seven signals.

The switch circuit 118 outputs the input signal S116 as the chrominance signal S118 for luminance separation when receiving the signal indicating "obliquely correlated" from the oblique correlation detection circuit 104, or outputs the input signal S115 as the chrominance signal S118 for luminance separation when receiving the signal indicating-"not obliquely correlated" from the oblique correlation detection circuit 104.

The subtractor 120 subtracts the chrominance signal S118 for luminance separation from the composite video signal S101 for the center line, to thereby separate the luminance signal S120 and output the luminance signal S120 to the RGB conversion circuit.

The switch circuit 119 outputs the input signal S117 as the chrominance signal S119 to the chrominance demodulation circuit when receiving the signal indicating "obliquely correlated" from the oblique correlation detection circuit 104, or outputs the input signal S116 as the chrominance signal S119 to the chrominance demodulation circuit when receiving the signal indicating "not obliquely correlated" from the oblique correlation detection circuit 104.

Figure 7:
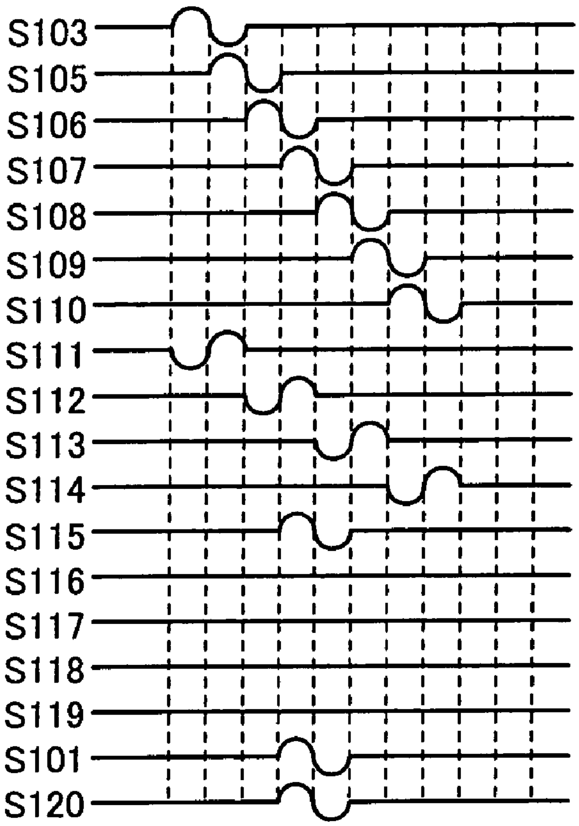
FIG. 7 is a view showing output waveforms of respective sections obtained when a 1-period oblique signal is input into the Y/C separation device of FIG. 2.

FIG. 7 shows waveforms of the signals S103, S105 to S120 and S101 obtained when an oblique line having a frequency component of one period is input.

Figure 8:
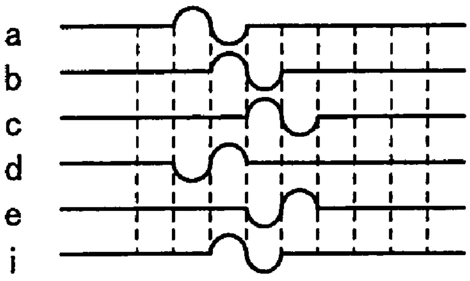
FIG. 8 is a view showing output waveforms of respective sections obtained when a 1-period oblique signal is input into a conventional Y/C separation device.

In the conventional Y/C separation device, when a signal of one period of the chrominance signal is included in the line correlation chrominance signal S103, the 1-period signal remains in the chrominance signal S118 for luminance separation as it is (see FIG. 8). In this embodiment, however, the Y/C separation device 3 can remove this 1-period signal.

Figure 9:
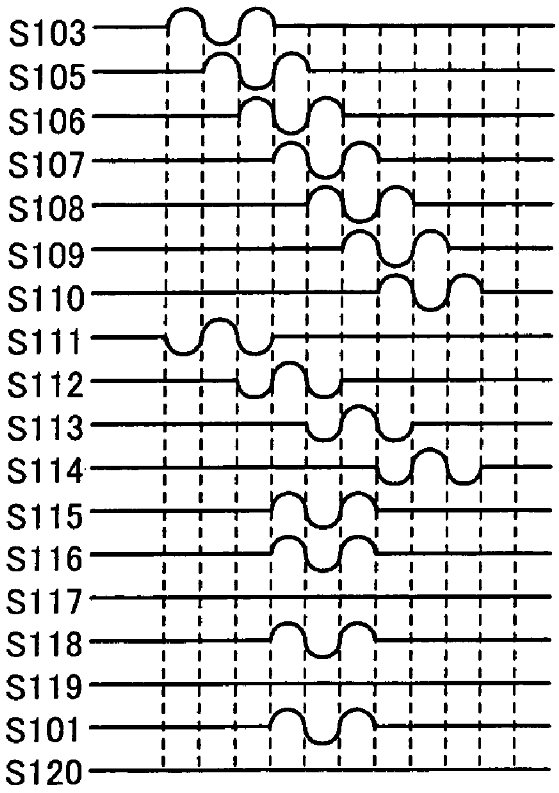
FIG. 9 is a view showing output waveforms of respective sections obtained when a 1.5-period oblique signal is input into the Y/C separation device of FIG. 2.

FIG. 9 shows waveforms of the signals S103, S105 to S120 and S101 obtained when an oblique line having a frequency component of one and a half periods is input.

Figure 10:
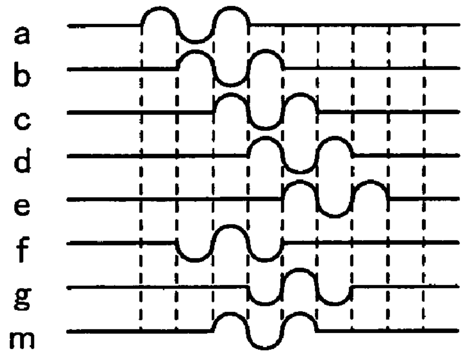
FIG. 10 is a view showing output waveforms of respective sections obtained when a 1.5-period oblique signal is input into the conventional Y/C separation device.
Figure 11:
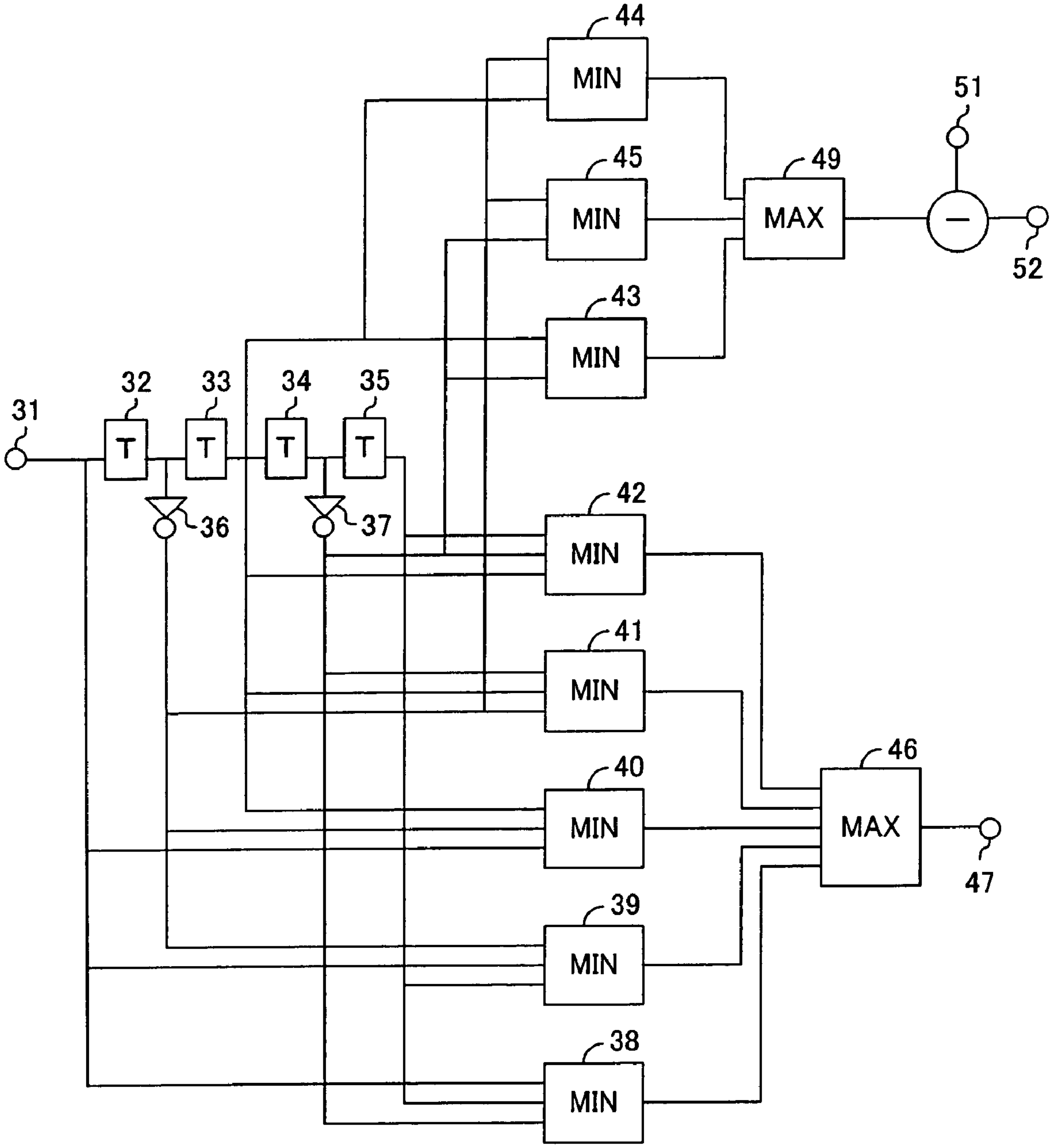
FIG. 11 is a block diagram of the conventional Y/C separation device.

In the conventional Y/C separation device, when a signal of 1.5 periods of the chrominance signal is included in the line correlation chrominance signal S103, the 1.5-period signal remains in the chrominance signal S119 as it is (see FIG. 10). In this embodiment, however, the Y/C separation device 3 can remove this 1.5-period chrominance signal.

<Effect>

In this embodiment, the oblique correlation detection circuit 104 detects correlation of a luminance signal component in an oblique direction from the 3-line video signals of the input composite video signal. The switch circuits 118 and 119 respectively switch the horizontal correlation detection range according to the result of the above detection. For example, conventionally, when oblique-direction luminance signal components representing oblique stripes, for example, in the signals S100, S101 and S102 to be input into the 3-line correlation chrominance separation circuit are input in the line correlation chrominance separation circuit 103, such components may fail to be correctly separated by the line correlation chrominance separation circuit 103, resulting in leaking into the line correlation chrominance signal S103. However, in the Y/C separation device 3 of this embodiment, the horizontal correlation range is widened in an event of input of such an oblique line. This can reduce occurrence of cross-color in the output chrominance signal S119 and also improve the oblique-direction resolution in the output luminance signal S120. In addition, since the horizontal correlation range can be narrowed when no oblique line is input, a normal chrominance signal can be output correctly, and this can suppress decolorization and reduction in color saturation that may occur due to excessively wide horizontal correlation range.

The above embodiment was described using switching between the horizontal 3-point correlation circuit 115 and the horizontal 5-point correlation circuit 116 and switching between the horizontal 5-point correlation circuit 115 and the horizontal 7-point correlation circuit 116 according to the result of the detection by the correlation detection circuit 104. The number of horizontal correlation points provided for oblique correlation may be increased to nine, eleven or more. Naturally, as the number of horizontal points is greater, the number of periods of a signal enabling suppression of cross-color is greater.

In this embodiment, the TV receiver was mentioned as equipment to which the present invention was applied. Alternatively, it may specifically be a liquid crystal TV, a plasma display TV and an organic EL TV, a video capture board, a personal computer, a videocassette recorder and the like.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A video signal processing device, comprising:

an oblique correlation detection section for detecting correlation in an oblique direction (oblique correlation) of a composite video signal;

a line correlation chrominance separation section for extracting a first chrominance signal from the composite video signal based on vertical correlation of the composite video signal; and a first chrominance signal acquisition section for acquiring a second chrominance signal based on horizontal self-correlation of the first chrominance signal, wherein the first chrominance signal acquisition section detects the self-correlation within a range corresponding to the degree of the oblique correlation detected by the oblique correlation detection section.

2. The device of claim 1, wherein the first chrominance signal acquisition section comprises:

a first chrominance signal extraction section for acquiring a third chrominance signal based on self-correlation within a first horizontal range of the first chrominance signal;

a second chrominance signal extraction section for acquiring a fourth chrominance signal based on self-correlation within a second horizontal range of the first chrominance signal; and a first chrominance signal selection section for selecting the third chrominance signal or the fourth chrominance signal as the second chrominance signal according to the degree of the oblique correlation detected by the oblique correlation detection section, wherein the second range is wider than the first range.

3. The device of claim 1, further comprising a subtractor section for extracting a luminance signal from the composite video signal based on the difference between the composite video signal and the second chrominance signal.

4. The device of claim 3, further comprising a second chrominance signal acquisition section for acquiring a third chrominance signal based on horizontal self-correlation of the first chrominance signal, wherein the second chrominance signal acquiring section detects the self-correlation within a range according to the degree of the oblique correlation detected by the oblique detection section, the range being wider than the detection range adopted by the first chrominance signal acquisition section.

5. The device of claim 4, wherein the first chrominance signal acquisition section comprises:

a third chrominance signal extraction section for acquiring a fourth chrominance signal based on self-correlation within a first horizontal range of the first chrominance signal;

a fourth chrominance signal extraction section for acquiring a fifth chrominance signal based on self-correlation within a second horizontal range of the first chrominance signal; and a second chrominance signal selection section for selecting the fourth chrominance signal or the fifth chrominance signal as the second chrominance signal according to the degree of the oblique correlation detected by the oblique correlation detection section, the second range is wider than the first range, the second chrominance signal acquisition section comprises:

a fifth chrominance signal extraction section for acquiring a sixth chrominance signal based on self-correlation within a third horizontal range of the first chrominance signal;

a sixth chrominance signal extraction section for acquiring a seventh chrominance signal based on self-correlation within a fourth horizontal range of the first chrominance signal; and a third chrominance signal selection section for selecting the sixth chrominance signal or the seventh chrominance signal as the third chrominance signal according to the degree of the oblique correlation detected by the oblique correlation detection section, the fourth range is wider than the third range, the third range is wider than the first range, and the fourth range is wider than the second range.

6. The device of claim 1, wherein the first chrominance signal acquisition section comprises:

a plurality of stages of delay circuits receiving the first chrominance signal as first-stage input; and a median value detection section for detecting a median value of P signals among the first chrominance signal and outputs of the plurality of stages of delay circuits determined according to the degree of the oblique correlation detected by the oblique correlation detection section and outputting the detected median values as the second chrominance signal, and the delay circuit at each of the plurality of stages delays the input signal by a half period of the first chrominance signal.

7. The device of claim 1, wherein the first chrominance signal acquisition section comprises:

a plurality of stages of delay circuits receiving the first chrominance signal as first-stage input;

a first median value detection section for detecting a median value (first median value) of P signals among the first chrominance signal and outputs of the plurality of stages of delay circuits;

a second median value detection section for detecting a median value (second median value) of Q signals (Q is greater than P) among the first chrominance signal and the outputs of the plurality of stages of delay circuits; and a selection section for outputting the first median value or the second median value as the second chrominance signal according to the degree of the oblique correlation detected by the oblique correlation detection section, and the delay circuit at each of the plurality of stages delays the input signal by a half period of the first chrominance signal.

8. The device of claim 4, wherein the second chrominance signal acquisition section comprises:

a plurality of stages of delay circuits receiving the first chrominance signal as first-stage input; and a median value detection section for detecting a median value of R signals among the first chrominance signal and outputs of the plurality of stages of delay circuits determined according to the degree of the oblique correlation detected by the oblique correlation detection section, and outputting the detected median value as the third chrominance signal, and the delay circuit at each of the plurality of stages delays the input signal by a half period of the first chrominance signal.

9. The device of claim 4, wherein the second chrominance signal acquisition section comprises:

a plurality of stages of delay circuits receiving the first chrominance signal as first-stage input;

a first median value detection section for detecting a median value (first median value) of R signals among the first chrominance signal and outputs of the plurality of stages of delay circuits;

a second median value detection section for detecting a median value (second median value) of S signals (S is greater than R) among the first chrominance signal and the outputs of the plurality of stages of delay circuits; and a selection section for outputting the first median value or the second median value as the third chrominance signal according to the degree of the oblique correlation detected by the oblique correlation detection section, and the delay circuit at each of the plurality of stages delays the input signal by a half period of the first chrominance signal.

10. A video signal processing method comprising the steps of:

(a) detecting correlation in an oblique direction (oblique correlation) of a composite video signal;

(b) extracting a first chrominance signal from the composite video signal based on vertical correlation of the composite video signal; and (c) acquiring a second chrominance signal based on horizontal self-correlation of the first chrominance signal, wherein in the step (c), the self-correlation is detected within a range corresponding to the degree of the oblique correlation detected in the step (a).

11. The method of claim 10, wherein the step (c) comprises the steps of:

(d) acquiring a third chrominance signal based on self-correlation within a first horizontal range of the first chrominance signal;

(e) acquiring a fourth chrominance signal based on self-correlation within a second horizontal range of the first chrominance signal; and (f) selecting the third chrominance signal or the fourth chrominance signal as the second chrominance signal according to the degree of the oblique correlation detected in the step (a), and the second range is wider than the first range.

12. The method of claim 10, further comprising the step (g) of extracting a luminance signal from the composite video signal based on the difference between the composite video signal and the second chrominance signal.

13. The method of claim 12, further comprising the step (h) of acquiring a third chrominance signal based on horizontal self-correlation of the first chrominance signal, wherein in the step (h), the self-correlation is detected within a range according to the degree of the oblique correlation detected in the step (a), the range being wider than the detection range adopted in the step (c).

14. The method of claim 13, wherein the step (c) comprises the steps of:

(i) acquiring a fourth chrominance signal based on self-correlation within a first horizontal range of the first chrominance signal;

(j) acquiring a fifth chrominance signal based on self-correlation within a second horizontal range of the first chrominance signal; and (k) selecting the fourth chrominance signal or the fifth chrominance signal as the second chrominance signal according to the degree of the oblique correlation detected in the step (a), the second range is wider than the first range, the step (h) comprises the steps of:

(l) acquiring a sixth chrominance signal based on self-correlation within a third horizontal range of the first chrominance signal;

(m) acquiring a seventh chrominance signal based on self-correlation within a fourth horizontal range of the first chrominance signal; and (n) selecting the sixth chrominance signal or the seventh chrominance signal as the third chrominance signal according to the degree of the oblique correlation detected in the step (a), the fourth range is wider than the third range, the third range is wider than the first range, and the fourth range is wider than the second range.

* * * * *